April 9, 1929.  I. H. SPENCER  1,708,907
CHECK VALVE
Filed April 13, 1927
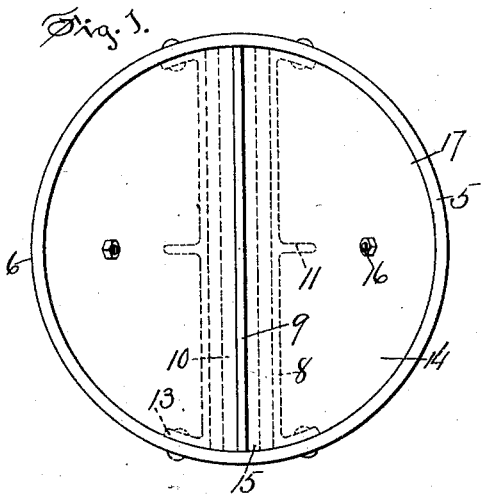
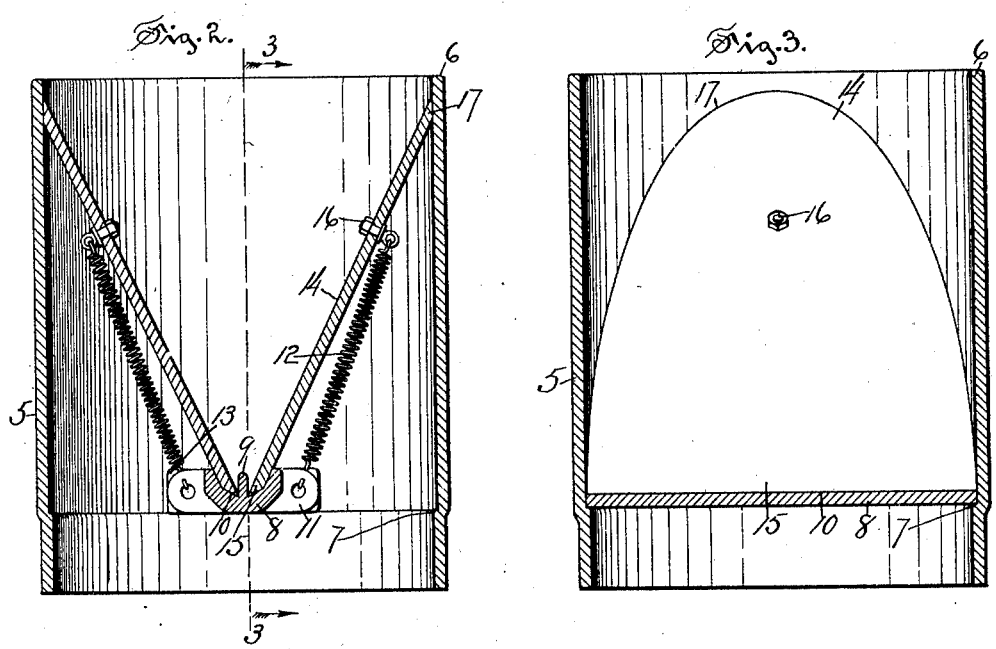
INVENTOR
Ira H. Spencer
by
Arthur B. Jenkins
ATTORNEY Patented Apr. 9, 1929.

1,708,907

UNITED STATES PATENT OFFICE.

IRA H. SPENCER, OF WEST HARTFORD, CONNECTICUT, ASSIGNOR TO THE SPENCER TURBINE COMPANY, OF WEST HARTFORD, CONNECTICUT, A CORPORATION OF CONNECTICUT.

CHECK VALVE.

Application filed April 13, 1927. Serial No. 183,298.

My invention relates to the class of valves employed for regulating flow of fluids through conduits, and an object of my invention, among others, is the production of a valve for this purpose that shall be simple in construction and particularly efficient in operation.

One form of a valve embodying my invention, and in the construction and use of which the objects herein set out, as well as others, may be attained, is illustrated in the accompanying drawings, in which—

Figure 1 is an end view of a pipe section equipped with my improved valve.

Figure 2 is a view in central lengthwise section through the same.

Figure 3 is a section on a plane denoted by the dotted line 3—3 of Figure 2.

In the accompanying drawings numeral 5 denotes a cylindrical body or section of a tube that is preferably formed of metal round in cross section and that may be provided at its ends with any suitable means for connection to other tube sections.

While my invention is not limited in its use in connection with any specific type of apparatus, yet as it finds ready adaptation for controlling flow of fluids through conduits connected with musical instruments it may be considered that the body 5 is a part of such a conduit. This section or body 5 may be readily bored straight and true from the end 6 to the shoulder 7 and a valve supporting bar 8 extends across the tube at its center and is secured thereto, the ends of the bar being turned to nicely fit the bored and round cylinder. This bar is of trough shape and has a web 9 projecting from the bottom of the trough at the crosswise center thereof, this web preferably extending for the full length of the bar and forming two grooves 10, one on each side of the web. Ears 11 are formed on opposite sides of the trough for the attachment of valve springs 12, and the bar 8 is provided at its ends with feet 13 by means of which it is secured to the body 5.

Valves 14 are located in the grooves 10, the hinged ends 15 of these valves being ground to a knife edge to nicely fit the grooves 10 which are ground to a corresponding shape. These ends of the valves rest in said grooves and are drawn thereinto by means of the springs 12 which are attached at their ends opposite the ears 11 to eye bolts 16 secured to the valves and as shown in Figure 2 of the drawings.

In fitting these valves they are held as by means of a jig in the relative positions that they assume in the valve body 5, and while so held they are turned so that the ends 17 accurately fit the cylindrical wall of the body 5.

It will thus be seen that the parts being thus nicely fitted, which is a comparatively simple matter, a check valve is provided that is substantially without rubbing friction, as the knife edge or scale joint 15 is substantially frictionless. The structure also provides a fluid tight valve in which a metal to metal contact is made at the valve seat.

From this construction it will be noted that the valves will readily open when the pressure is reduced sufficiently for this purpose, and further that this pressure as it increases will cause the valves to seat more tightly against the wall of the body 5.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:—

1. A check valve comprising a tubular body, a valve support extending across the body and having a valve supporting groove, a valve having one end seated in said groove and its opposite end formed to seat against the wall of said body, and means individual to said valve for drawing said valve against its seat in said groove and against the seat on the wall of said body.

2. A check valve comprising a tubular body, a valve support extending across the body and having a valve supporting groove, a valve extending diagonally from said support and having one end seated in said groove and its opposite end formed to seat against the wall of said body, and a spring secured at one end to said valve and at its opposite end near said support to draw said valve against the seats at opposite ends thereof.

3. A check valve comprising a tubular body, a valve support extending across the body at the widest portion thereof and having valve supporting grooves, valves each having one end seated in one of said grooves and projecting diagonally therefrom to make contact with the wall of said body, and means individual to each valve for drawing that valve against its seat in one of said grooves and also against the wall of said body.

4. A check valve comprising a tubular body, a supporting bar extending across the body at the widest portion thereof and having a groove extending lengthwise thereof, a web projecting from the bottom of said groove dividing it into two portions, valves each having one edge seated in one of said portions of said groove and projecting diagonally therefrom to make contacts with the wall of said body, and springs each secured at one end to one of said valves and at its opposite end to a point near said bar.

5. A check valve comprising a tubular body ground to round form in cross section, a valve supporting bar having its ends accurately fitted to diametrically opposite sides of said body and secured thereto, said bar having a groove, valves having valve seating ends ground to fit the walls of said body and with their opposite ends seated in said groove, and springs secured to said valves and to said bar to draw each valve against both of its seats.

IRA H. SPENCER.